United States Patent Office 3,162,834
Patented Dec. 22, 1964

3,162,834
FLIGHT DIRECTOR AIRCRAFT INSTRUMENT
Horst M. Schweighofer and Harry M. Passman, both of Cedar Rapids, Iowa, assignors to Collins Radio Company, Cedar Rapids, Iowa, a corporation of Iowa
Filed May 3, 1961, Ser. No. 107,425
19 Claims. (Cl. 340—27)

This invention relates generally to aircraft guidance and more particularly to an aircraft instrument combining indications of aircraft attitude with steering command information and displacement data.

The utility of instrumentation providing aircraft guidance information is limited by the extent to which the various indications require interpretation and mental calculation by the pilot in "picturing" the flight situation. Instrumentation design has been considerably improved, in this regard, by the combined display of basic attitude information (pitch and roll indication) in conjunction with flight command data. A combination of these two basic types of indication provides the pilot with an indication of the aircraft's attitude together with various indicia which show that a proper corrective action has been initiated by the pilot to attain a given commanded situation. Patent No. 2,943,482 to Edgar H. Fritze and Horst M. Schweighofer teaches a combined instrument of this type, wherein a display of basic aircraft attitude is combined with steering command indications.

The command indication provided by instruments of the above-referenced type employ the concept of a "forward view" towards the end of providing as nearly a pictorial indication as possible of the flight situation. This prior concept is based on displaying an error signal which indicates the corrective action to be taken by the pilot in order to initiate the return of the aircraft to the desired flight path, direction, and attitude. The error signal is "zero" when the corrective action has been initiated.

Considering the high performance capabilities of present-day aircraft and future projections of considerably higher performance types, it is desirable if not imperative that instrumentational aids for aircraft guidance be made increasingly more interpretable. The pilot of high performance aircraft must continually be advised of attitudes and command information which tell him not only that he is "doing the right thing" but, in addition, tell him clearly the extent to which command reaction is being attained so that he might more realistically be advised of his aircraft's attitude, the commands which he must initiate to alter his flight situation, and the extent to which his attitude and location are changing in response to commands.

It is an object, therefore, of the present invention to provide an improved aircraft instrument of the type combining attitude, displacement, and steering command indications.

A further object of the present invention is the provision of an aircraft instrument in which the attitude and command indicia are more truly indicative of a "forward view" and in which command information is more realistically and therefore more clearly presented.

A further object of the invention is the provision of a combined command and attitude display in which the command indication is pictorially presented in conjunction with the aircraft attitude situation in a manner such that command interpretation is instinctive while the attitude situation correspondingly coats clearly to indicate aircraft command reaction.

Still a further object of the present invention is the provision of an aircraft guidance aid which combines flight path deviation and touchdown altitude information in a directly interpretable pictorial arrangement.

A feature of the present invention is the combination of a pitch and roll stabilized horizon indicator with a combined pitch and bank command indicator, each of which are referenced to the aircraft in a "forward view" concept.

The invention is further featured in the provision of an instrument of the above-described type into which a three-dimensional perspective is incorporated such that the observer is presented with a truly pictorial "forward view" combining aircraft attitude information with steering command information which simulates a three-dimensional "path" onto which he "flies" his aircraft.

These and other objects and features of the present invention will become apparent upon reading the following description in conjunction with the accompanying drawings, in which.

Figure 2:
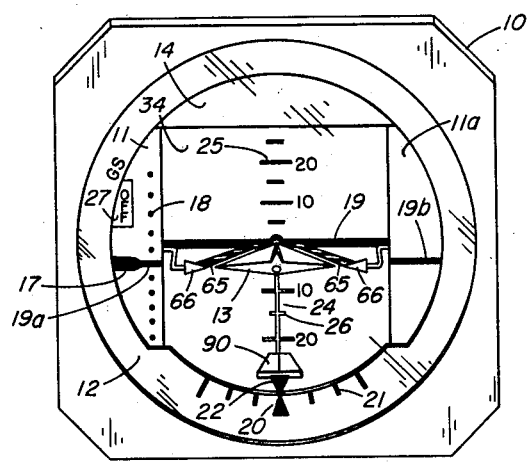
FIGURE 2 is an observer's view of the front face of the assembled instrument under a commanded and attained straight and level flight situation.

An observer's view of the instrument is pictured in FIGURES 2 through 5. With reference to FIGURE 2, a front face member 10 is formed with a transparent circular face member 14 through which the assembled attitude, displacement, and command indicative indicia are viewed. An aircraft simulating reference 13 is affixed to the face member 14 and is seen to be symmetrically disposed about the longitudinal axis of the instrument in a manner indicating the longitudinal and lateral aircraft axes. The attitude of aircraft simulating member 13 is therefore, analogous to that of the aircraft with respect to which the front panel member 10 is rigidly affixed. A horizon indicating line 19 is juxtaposed with the leading extremity of aircraft simulating member 13. The horizon indicator 19 is rotatable about the longitudinal axis of the instrument and transversely displaceable with respect thereto in accordance with aircraft bank and pitch attitudes respectively. A circular mask member 12 is disposed directly behind the face member 10 and provided on the lower extremes thereof with a a plurality of circumferentially displaced reference markers 21 including a center reference index 20. A bank indicating pointer 22 is affixed on a line perpendicular to horizon line 19 and rotates with horizon line 19 about the longitudinal axis of the instrument in accordance with aircraft roll. The alignment of bank indicating pointer 22 and bank reference index 20, as illustrated in FIGURE 2, indicates a zero bank attitude of the aircraft. The plurality of fixed reference marks 21 may then indicate calibrated degrees of bank from horizontal.

A further pair of masking members 11 and 11a extend vertically on either side of the instrument face and include horizontal reference index marks 19a and 19b respectively. Reference indices 19a and 19b serve as a zero reference for a command-plane indicator comprised of indices 66 and longitudinally extending and converging guide members 65. The command marker or command plane indicating markers 65–66 are rotatable with respect to the aircraft simulating reference 13 in accordance with bank command signals and displaceable above and below the longitudinal axis of the instrument in accordance with pitch command signals. The aircraft attitude is thus indicated by the orientation of horizon indicator 19 with respect to the aircraft simulating reference 13. Horizon line 19 rotates to indicate aircraft bank attitude and is displaceable above and below the aircraft simulating reference 13 in accordance with aircraft "nose-down" and "nose-up" attitudes respectively. The combination of the fixed aircraft reference 13 and the horizon indicator 19 thus provides a basic pictorial aircraft attitude indication. The extent of aircraft pitch above and below the horizon is indicated by reference marks 26 and 25 as read in conjunction with the forward extremity of aircraft simulating reference 13. The degree of aircraft bank, as above described, is directly readable from the relative position of bank indicating pointer 22 with respect to the fixed references 21.

The command-plane assembly comprised of markers 65–66 is positionable with respect to the aircraft reference 13 in accordance with pitch and bank command signals and defines, by its relative orientation with respect to the aircraft reference 13, the degree of pitch change and/or bank change required to attain a commanded flight situation. The command indication is independent of the aforedescribed attitude indication and, under conditions of proper response to a given command, the command-plane defined by markers 65–66 is symmetrically juxtaposed with the aircraft simulating reference 13. Under conditions of an unattained command, the command-plane assembly is displaced from aircraft reference 13 in accordance with a commanded change in pitch attitude and is angularly displaced with respect to the lateral axis of aircraft symbol 13 in accordance with a commanded change in bank attitude. Since the pair of command markers 65–66 define a command-plane, the assembly functions as a "path" onto which the pilot "flies" the reference aircraft symbol 13.

In addition to the aircraft attained attitude display and the commanded attitude display above described, the instrument further includes displacement indicating indicia. A pointer 17 is displaceable with respect to horizontal reference 19a in accordance with aircraft deviation from a glide slope path. The pointer 17 represents the vertical position of the glide slope with respect to the aircraft reference symbol 13. As will be further discussed, displacement from glide path may be incorporated in the development of a pitch command signal to transversely displace command marker members 65–66 to command a change in pitch to reduce the glide slope displacement to zero, such that glide slope displacement pointer 17 becomes aligned with the horizontal reference index 19a.

The present invention incorporates a further displacement indicator in the form of a ground path and/or runway simulating member 90 as will be further described. Means are incorporated to displace indicator 90 to the left and right of vertical reference line 24 in accordance with aircraft deviation from a selected course. Member 90 is mounted with respect to an assembly carrying horizon indicator 19 such that it is likewise stabilized in roll and thus member 90 is rotatable about the longitudinal axis of the instrument as well as transversely displaceable with respect to the reference line 24 which extends on a perpendicular bisector of horizon line 19.

Still further displacement means are provided by the invention in the provision for translating the course line indicator 90 radially inwardly toward the longitudinal axis of the instrument in accordance with aircraft altitude above the runway to provide a graphic picture of the approach, flare out, and touchdown flight phases. Means will be described by which the runway indicator 90 is translated toward the instrument longitudinal axis in accordance with a runway altitude sensor.

The instrument thus provides a plurality of indices moving with respect to the fixed aircraft symbol 13, the relative positions thereof with respect to the symbol 13 providing:

(1) A continuous display of instantaneous aircraft bank and pitch attitude;

(2) A continuous display of commanded changes in pitch and bank attitude to make good a given flight path in accordance with external sensors from which command signals are formulated;

(3) A display of aircraft displacement from a glide path;

(4) A display of aircraft lateral deviation from a preselected course line; and (5) A display of aircraft altitude above touchdown.

Figure 1:
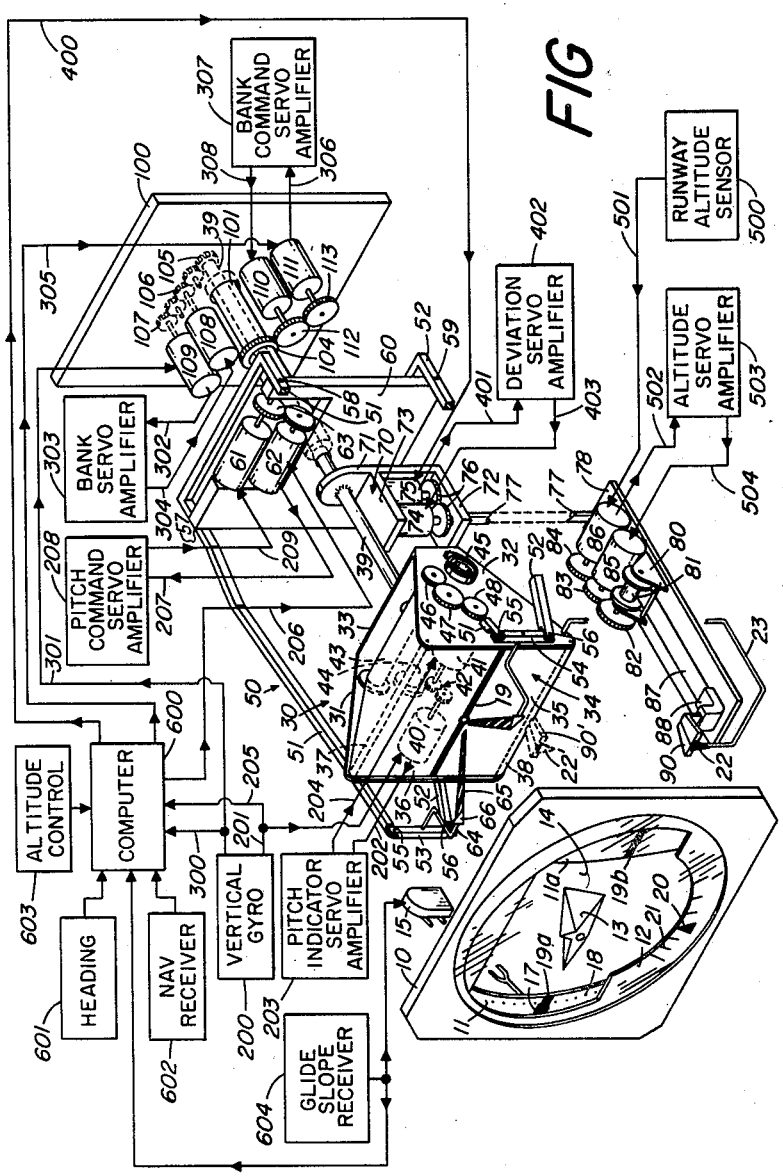
FIGURE 1 is a functional isometric view of a preferred embodiment of the invention including functional electrical connections.

The manner in which the aforedescribed displacements and relative rotations of indicia may be attained is illustrated in an embodiment of the invention as functionally illustrated in FIGURE 1. The instrument is comprised of a front mounting member 10 with transparent face member 14 to which the aircraft symbol 13 is affixed, and a rearwardly disposed mounting plate 100 with respect to which functional subassemblies are mounted.

Horizon line 19 forms part of an horizon indicating assembly 30, the entire assembly 30 being rotatable with respect to the rear mounting plate 100.

A second major assembly is that of the command indicator assembly 50 which includes a rearwardly disposed mounting plate 60 rotatably mounted with respect to the rear mounting plane 100.

A combined course deviation and touchdown altitude indicator assembly is affixed with horizon indicating assembly 30 for rotation therewith about the longitudinal axis of the instrument. The assembly is additionally rotatable with respect to its mounting axis such that the assembly is roll stabilized in accordance with horizon indicator 30 and permits of translation of course line indicator 90 transverse of the longitudinal axis of the instrument.

In the illustrated embodiment of FIGURE 1, the front mounting plate 10 and the elements affixed thereto are shown displaced from assembled position with respect to the instrument; it being realized that in assembled position, the aircraft simulating reference 13 is oriented symmetrically with respect to command markers 65–66 and the horizon line 19. The command markers 65–66, in the horizontal position indicated in FIGURE 1, would then be symmetrically juxtaposed about the transverse extremes of the aircraft simulating reference 13 and the "nose" of the aircraft reference 13 would be juxtaposed with horizon line 19.

The combined course deviation and touchdown altitude indicating assembly is also shown displaced from the assembled position indicated by the phantom representation 90′ of the runway simulating member 90.

The relative orientation of the fixed and movable indicia of FIGURE 1 assume the relative orientations illustrated in FIGURE 2 upon the assembly.

Horizon Indicating Assembly

Horizon indicating assembly 30 carries horizon indicator 19 and, as above discussed, must therefore be stabilized in roll with respect to aircraft bank attitude and translatable in accordance with aircraft pitch attitude. With reference to FIGURE 1, horizon indicating assembly 30 is seen to be comprised of a generally U-shaped frame including side frame members 31 and 32 joined by a rear frame member 33; rear frame member 33 being substantially parallel to the rear instrument mounting frame 100. Rear mounting frame 33 is affixed to a mounting shaft 39 which is rotatably received in rear mounting member 100. Shaft 39 is rotatable with respect to rear mounting plane 100 by means of a drive gear 105 affixed to the rear extremity of the shaft. The horizon assembly mounting frame carries a tape member 34 across which horizon indicator line 19 is imprinted or affixed. The horizon tape member 34 is divided by horizon indicator 19 into a lower portion 35 and an upper portion 36, which portions generally indicate the ground and sky areas defined by the horizon. Horizon tape member 34 is carried over idler roller members 37 and 38 to take-up and supply tape spools 43 and 44, respectively. Each of the tape spools 43 and 44 is rotatably mounted in the side mounting plates 31 and 32 and extends transverse of the longitudinal axis of the instrument defined by the mounting shaft 39. The lower tape spool 44 is spring loaded by means of coil spring member 45 with respect to the assembly mounting frame and the upper tape spool 43 is given a driving motion to effect a translation of the tape 34 on the frame in accordance with aircraft pitch attitude. The drive is imparted against the spring loading of the lower spool 44 for upward translation of the horizon tape and accordingly, for an oppositely imparted drive motion, the lower spool 44 serves as a take-up for the tape 34 and maintains proper tension of the tape with respect to the idler rollers 37 and 38. Thus, a driving motion is imparted to the tape to effect a translation of horizon indicator 19 transverse of the longitudinal axis of the instrument defined by mounting shaft 39. Driving motion is imparted to tape spool 43 through a drive gear 46 affixed to the spool. Spool drive gear 46 is associated with a gear drive including an idler gear 47 and a driving gear 48. Driving gear 48 is attached to the shaft of a servomotor 41 which, in conjunction with a pitch attitude servo loop to be further described, effects the desired tape motion. The upper and lower portions of the horizon tape 34 as defined by horizon indicator 19 may be provided with a plurality of indications 25 and 26 (see FIGURE 2) which serve as indications of degree of pitch attitude above and below horizontal when read in conjunction with the rearward extremity of aircraft simulating member 13. In a preferred embodiment the upper portion of the horizon tape would be of a light background to simulate the sky while the lower portion of the tape (that beneath the horizon indicator 19) would be of a darker shade to simulate ground.

Figure 7:
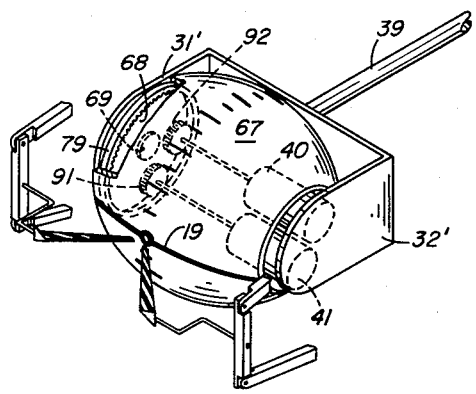
FIGURE 7 illustrates an alternate horizon assembly.

FIGURE 7 illustrates an alternate form of horizon indicating assembly while might be incorporated wherein horizon indicator 19 is extended transversely on the surface of a spherical member 67. Spherical member 67 is rotatable about mutually perpendicular axes such that horizon indicator 19 is rotatable about the instrument longitudinal axis in accordance with aircraft bank attitude and is transversely displaceable from the instrument longitudinal axis in accordance with aircraft pitch attitude. In the illustrated embodiment, spherical member 67 is formed as a hollow prolate spheroid and includes an end bearing plate 68 which receives a mounting shaft 69; the shaft being affixed to the assembly side mounting frame member 31'. The side of spherical member 67 opposite bearing plate 68 is open and juxtaposed with side mounting frame member 32'. Pitch servo motor 41 and pitch synchro 40 are affixed to mounting frame member 32' and extend within the confines of spherical member 67. Rotation of spherical member 67 about its mounting shaft 69 is imparted through driving engagement of the motor drive gear 91 with a ring gear member 79 which might be affixed to or form an integral part of end bearing plate 68 and is disposed circumferentially about the longitudinal axis of mounting shaft 69. Pitch synchro 40 is positioned in accordance with the rotational motion of member 67 by means of a gear 92 in driven engagement with ring gear member 79.

*Command Indicator Assembly*

The command indicator assembly 50, as previously described, includes means for rotating command markers 65–66 in accordance with bank command signals and for displacing the command markers 65–66 from the longitudinal axis of the instrument in accordance with pitch command signals.

To this end, the command indicator assembly 50 comprises a rear mounting plate 60 affixed to a mounting shaft 101 with the rearward extremity of shaft 101 being rotatably received in the fixed instrument rear mounting plate 100. A rotation of shaft 101 with respect to fixed mounting plate 100 is effected through a gear 104 concentric to shaft 101 and driven by a gear 112 which is associated with a roll command servomotor 110. Servomotor 110 is associated with a servo loop to be further described which effects a rotation of motor 110, in accordance with bank command signals. Thus, the mounting plate 60 of command indicator assembly 50 is rotated about the longitudinal axis of the instrument with respect to the instrument rear mounting plate 100 in accordance with bank command signals.

The rotation of the command marker assembly mounting plate 60 is likewise imparted to each of the command indicators 65–66 through a linkage arm assembly including members 51 and 52. Each of the members 51 and 52 is comprised of a generally U-shaped member pivotally supported in mounting plate 60. The upper U-shaped member 51 is pivoted at points 57 and 58 on the upper portion of mounting plate 60 while the lower U-shaped linkage member 52 (partially illustrated) is similarly pivoted at the lower extremity of mounting plate 60, one pivot point 59 of which is illustrated. The two U-shaped members 51 and 52 are terminated by interlinking crossmembers 53 and 54. Linkage member 53 is pivotally connected to members 51 and 52 at pivot points 55 and 56. Linkage member 54 is similarly pivotally connected to arm members 51 and 52 at pivot points 55 and 56. Each of the command indicator markers 65–66 is affixed to one of the interlinking members 53 and 54. The lefthand command marker is affixed in a plane substantially perpendicular to linkage member 53 by means of a mounting arm 64. The righthand command indicator is similarly affixed to the linkage arm 54. The plane defined by the command indicator members 65–66 is thus rotatable about the longitudinal axis of the instrument in accordance with the command indicator rear mounting plate 60 and thus its rotation is in accordance with bank command signals.

As previously discussed, the command indicator 65–66 is displaceable transversely from the longitudinal axis of the instrument in accordance with pitch command signals. This movement is realized by a rotation of the linkage arm assembly about the pivot axis on mounting plate 60. This motion might be imparted as illustrated in the embodiment of FIGURE 1 by means of a pitch command servomotor 61 affixed to mounting plate 60 with a drive shaft rigidly affixed to the upper U-shaped linkage arm 51 at pivot point 58. Pitch command servomotor 61 forms a part of a servo loop to be further described which is responsive to pitch command signals. Rotation of motor 61 pivots the linkage arm assembly with respect to mounting plate 60 and thus effects a translation of the command indicators 65–66 which is substantially transverse to the longitudinal axis of the instrument. Motor rotations in response to pitch-up and pitch-down commands, therefore, effect like displacements of the command indicators 65–66 from the instrument longitudinal axis. As viewed in FIGURE 1, a clockwise rotation of arm 51 about pivot point 58 is thus seen to raise the command indicators and to simultaneously effect an upward inclination of the plane defined by the command indicators; since the pivot action effects a simultaneous counter-clockwise rotation of the forward inter-linking members 53 and 54 to which the command indicators are rigidly affixed. The pitch-up command is, therefore, accordingly viewed advantageously as a raising of the command plane defined by the indicators 65–66 above the aircraft simulating reference 13 with a simultaneous upward inclination of the command plane in the direction of flight such that the command is realistically presented. For the zero pitch command situation illustrated in FIGURE 1 and as viewed in FIGURE 2, the command plane defined by the command markers 65–66 is coincident with the longitudinal axis of the instrument and that of the aircraft simulating reference 13. In response to pitch-down command, the markers 65–66 are displaced downwardly from the longitudinal axis and the command plane defined thereby is simultaneously inclined downwardly in the direction of flight.

The command indication is thus seen to be that of a command plane defined by the command markers 65–66. The command plane is rotatable about the instrument longitudinal axis in accordance with bank command signals and is displaceable "above and below" the instrument longitudinal axis and simultaneously inclined with respect to the longitudinal axis in response to pitch command signals.

*Course Deviation and Altitude Indicating Assembly*

The deviation and altitude indicating assembly of the present invention is included to impart realistic motion to the combined course line position and altitude simulator 90. Member 90 serves as a runway simulator in approach mode operation of the instrument and as a ground course line to be followed during enroute navigational modes. In either intended operational mode, the indicator 90 is displaceable to either side of a center reference in accordance with course deviation. In approach operational mode, the member 90 is additionally given an "upward" translation toward the longitudinal axis of the instrument. More precisely, the member 90 indicates aircraft height above the runway by being displaced radially inwardly toward the instrument longitudinal axis. To this end, the runway or course line simulator member 90 is mounted with respect to a base mounting member 78 which lies generally in a plane beneath and parallel to that defined by the aircraft reference 13 and the longitudinal axis of the instrument. Member 90 is stabilized in roll as is the horizon indicator 19, and, to this end, is rotated in accordance with the horizon indicator mounting shaft 39 by means of a shaft 77 and a further mounting assembly 70 having a transverse portion 71 thereof affixed to the shaft 39. The base mounting plate 78, which carries the runway indicating member 90, is rotatable with respect to the mounting frame 70 which is, in turn, affixed to shaft 39 for rotation therewith about the longitudinal axis of the instrument. The rotation of the mounting base 78 with respect to assembly 70 is imparted by means of a deviation servomotor 74 rigidly affixed to mounting member 70. Deviation servomotor 74 forms a part of a servo loop responsive to course line deviation signals. The runway simulator member 90 is translated radially inwardly toward the instrument longitudinal axis in response to altitude sensing signals and to this end the indicator 90 is mounted on the upturned end of a tape member 87 such that translation of the tape 87 with respect to the base mounting member 78 effectively "raises and lowers" the indicator 90. Tape 87 might be of a spring steel type like that employed in measuring tapes which exhibits a degree of flexible rigidity and which may be translated by application of a longitudinal force. The tape 87 has one end wound on a supply spool 81 which is rotatably mounted with respect to the base member 78 by means of bearing support members 80. Translation of tape 87 with respect to the base member 78 is imparted by rotation of the spool 81. A drive gear 82 is affixed to the shaft of spool 81 and is driven by a gear 83 on the shaft of an altitude servomotor 85. The altitude servomotor forms a part of a servo loop wherein the motor is activated in response to signals indicative of aircraft altitude above a predetermined reference. Rotation imparted by motor 85 therefore imparts a translation of tape 87 with respect to the base 78 in accordance with the winding and unwinding actions of spool 81. The tape is carried through a tape guide member 88 which confines the tape and imparts a right-angled bend thereto. The runway simulating member 90 is thus moved transverse to the base mounting member 78 and directed radially inwardly toward the longitudinal axis of the instrument. The runway simulating member 90 may be formed, as illustrated, with a taper to enhance the illusion of depth and perspective when viewed from the front face of the instrument.

The bank indication pointer 22 was previously described as being oriented on a perpendicularly bisector of the horizon indicator 19 and beneath the horizon line such that it is oriented adjacent the bank indication reference marks 20 and 21 on the lower extremity of the front face masking member 12. FIGURE 1 illustrates the bank indicating pointer 22 as being mounted by means of a rigid mounting arm 23 which is affixed with respect to the horizon indicating assembly shaft 39 and thus rotates about the longitudinal axis of the instrument with the horizon indicator 19. In assembled relationship, the bank indicator pointer 22 is thus juxtaposed with the reference marks 20 and 21 to provide the bank angle indication.

The mechanical motions imparted to the various indicia are illustrated in FIGURE 1 as being servo activated. Each of the servo loops comprises the above-described servo-drive motors in conjunction with an associated feedback device and "position" input signal. Each of the servo loops operates on a synchro-null principle.

Figure 6:
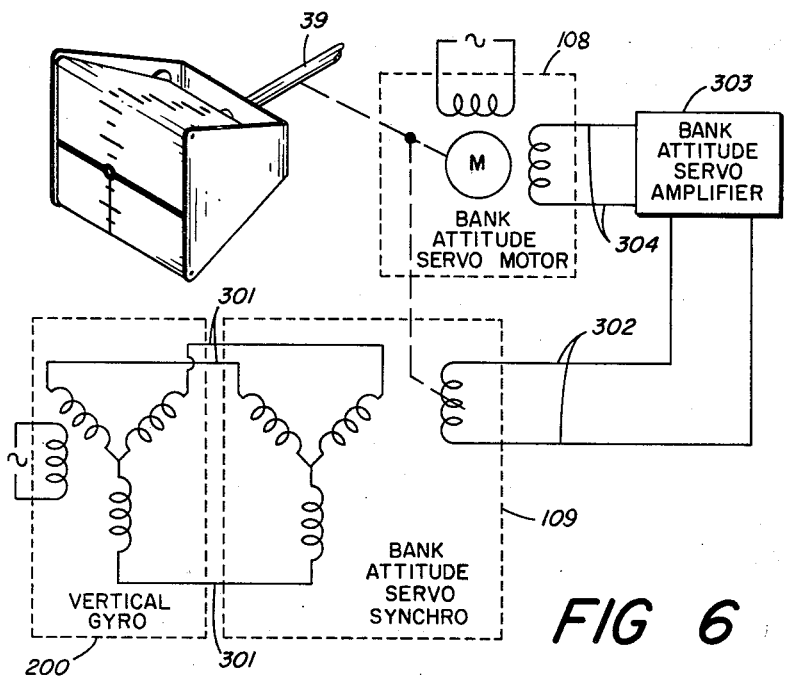
FIGURE 6 is a functional schematic diagram of a typical servo-positioning means which may be employed.

The horizon indicator 19 is rotated with the assembly mounting shaft 39 with respect to the rear mounting plate 100 as imparted by bank attitude servomotor 108. Rotation of servomotor 108 is imparted through its drive gear 106 and appropriate gear train to the driven gear 105 on shaft 39 and through the driven gear 107 on the shaft of bank attitude synchro control transformer 109. As illustrated in FIGURE 6, a vertical gyro 200 provides an electrical signal indicative of bank attitude through connector 301 to the stator of bank attitude synchro 109. The rotor of synchro 109 produces an error signal proportional to the miscorrespondence between the angular position of shaft 39 and that defined by the bank attitude signal from gyro 200. This error signal is connected through connector 302 to a bank servo amplifier 303. Servo amplifier 303 develops a motor control signal carried through connector 304 to the bank servomotor 108. Motor 108 rotates until the rotor of synchro 109 is repositioned to null the error voltage applied to the servo amplifier. The servo loop is a conventional remote positioning arrangement by which the horizon indicator 19 may be stabilized with respect to aircraft bank attitude by the tie-in with vertical gyro 200.

The transverse displacement of horizon indicator 19 is effected by the positioning of the horizon tape 34 in accordance with a rotational input imparted from drive gear 46 on takeup spool 43. The drive to gear 46 is imparted through idler gear 47 from the drive gear 48 on the shaft of pitch attitude servomotor 41. Rotation of motor 41 imparts a movement of the horizon tape 34 with respect to its mounting assembly. Pitch attitude servomotor 41 is driven in accordance with signals from a pitch attitude servo amplifier 203 through input connector 204. The input to servo amplifier 203 is applied from a pitch attitude synchro 40 through connector 202. The rotor of synchro 40 is positioned in accordance with the rotation of servomotor 41 through the gear train 42. The vertical gyro 200 produces an output 201 indicative of aircraft pitch attitude which is supplied to the stator of pitch attitude synchro 40. The pitch indication servo loop, like that of the bank attitude servo loop, operates on a null principle to position the horizon tape 34; and thus horizon indicator 19 is positioned in accordance with aircraft pitch attitude as determined by vertical gyro 200.

The rotational and translational motions of command markers 65–66 are likewise servo positioned. Rotation of the command indicator mounting plate 60 is imparted with respect to rear mounting plate 100 by bank command servomotor 110 which is affixed to rear mounting plate 100. Drive gear 112 rotates the mounting shaft 101; shaft 101 being affixed to command indicator mounting plate 60. It is to be noted that this rotation in response to bank command is effected independently of the rotation imparted to the horizon indicating assembly. The mounting shaft 39 for horizon indicating assembly 30 is rotatably received through command mounting indicator 60 and is further rotatably received concentrically within the shaft 101 which positions the mounting plate 60. Rotation of shaft 101, and thus of the command indicators 65–66, is likewise imparted to a bank command synchro 111 through the latters' drive gear 113. The bank command servomotor 110 is energized in accordance with an input 308 from bank command servo amplifier 307. Bank command synchro rotor output is applied through connector 306 to the servo amplifier 307. The stator of the bank command synchro 111 receives an electrical output indicative of bank command through connector 305 from a flight director computer 600. This servo loop then imparts a rotational motion about the longitudinal axis of the instrument of the command markers 65–66 in response to bank command signals.

The translation of command markers 65–66 was previously described as being effected by a rotary motion imparted to the linkage arm assembly 50 in accordance with rotation of pitch command servomotor 61. Servomotor 61 is connected to a pitch command servo amplifier 208 through connector 209 and rotation of motor 61 is imparted to the rotor of a pitch command synchro 62 which supplies an output through connector 207 to servo amplifier 208. The stator of pitch command synchro 62 receives an electrical signal indicative of pitch command through connector 206 from the flight director computer 600.

The deviation servomotor 74, which displaces runway simulator 90, is included in a similar type servo loop. A deviation servo amplifier 402 provides an output to servomotor 74 through connector 403 and receives an input error signal through connector 401 from a deviation synchro 75. The rotor of synchro 75 is positioned by servomotor 74. The stator of deviation synchro 75 receives an electrical signal indicative of deviation from a preselected course through connector 400 from flight director computer 600.

A further translation of the runway simulating member 90 was described as being effected by the rotation of altitude servomotor 85. Servomotor 85 is included in a servo loop including an altitude servo amplifier 503 which effects a rotation of motor 85 in accordance with aircraft altitude above runway as determined by altitude sensor 500. Interconnections 501, 502, and 504 complete this servo loop which is functionally identical with those above described.

The signals in response to which the various indicia are positioned are formulated or computed from a plurality of signal sources originating with basic attitude, altitude, azimuth, and displacement sensors. FIGURE 1 shows the functional relationship of these several sensors as they might be employed in conjunction with the instrument. As above described, the basic attitude sensor comprises a vertical gyro 200 including pickoffs developing signals indicative of aircraft pitch and bank attitudes. These signals are applied to the corresponding basic attitude servo loops associated with the horizon indicating assembly 30.

A glide slope receiver 604 develops a signal indicative of aircraft deviation from a radio defined glide path and this signal is applied to a glide slope meter movement 15 to effect vertical displacements of glide slope pointer 17 from its zero reference 19a. In a preferred embodiment, the glide slope receiver output is so polarized with respect to meter movement 15 as to effect upward and downward displacements of pointer 17 in response to aircraft positions below and above the glide path, respectively.

The translation of runway simulator member 90 with respect to the aircraft simulator 13 is responsive to a runway altitude sensor 500, which might comprise a radar altimeter which develops a signal indicative of altitude above the runway.

The previously referenced command signals applied to the command indicator assembly 50 are composite signals formulated within computer 600 from algebraic summations of the signals emanating from the various sensors. Thus, computer 600 receives basic attitude information from vertical gyro 200 and additionally receives input signals from glide slope receiver 604, heading error development circuitry 601, a navigation receiver 602, and an altitude controller 603. Heading error development circuitry 601 may be comprised of circuitry which compares magnetic compasss heading with a selected course to be flown, and from the comparison therebetween develops an electrical signal proportional to the discrepancy between the aircraft heading as defined by compass and a selected heading to be flown. Error development circuity of this type is shown and described in Patent No. 3,041,607 to M. H. Rhodes et al. Altitude control 603 might be any of a number of devices including a barometric altitude sensor which senses change in altitude by detecting the corresponding change in barometric pressure and converts this change into a proportional electrical signal. The output from altitude control 603 is thus an electrical signal indicative of the deviation from a selected altitude and generally is included in command signal computation within computer 600 as an alternate input with that from glide slope receiver 604. An altitude control of this general type is shown and described in Patent 2,875,965 to W. G. Anderson et al. Computers of this type are known in the art and it would suffice generally to state that steering command signals are formulated therein indicative of the difference between a basic pitch or bank attitude as defined by the gyro 200 and a "command" signal indicative of the degree of pitch or bank corresponding to a commanded flight situation. The command is "compared" to the instantaneous attitude and the difference therebetween is the output command signal. For example, the bank command signal might be computed from an algebraic summation of bank angle, heading error and course line deviation which essentially is a solution of the general equation of motion including acceleration, velocity, and displacement components. Computation circuitry for formulation of a bank command signal might be that as described in Patent No. 3,041,607 to M. H. Rhodes et al. Similarly, pitch commands may be formulated from a general solution of the equation of motion in the vertical plane wherein the pitch angle, altitude hold or glide slope deviation would be algebraically combined for development of a signal indicative of the extent of pitch change which must be introduced to attain a command flight situation. Computation circuitry of the type developing a pitch command signal is described in Patent No. 2,939,137 to D. C. Sather. The pilot, in controlling the aircraft to maintain the steering command indicator 65–66 symmetrically juxtaposed with the aircraft simulating reference 13, is therefore essentially following pitch and roll error signals as developed in computer 600. The degree of translation and rotation of the command plane defined by the command markers 65–66 is a measure of the extent and direction that the pilot should respectively pitch and bank the aircraft to make good his course.

It should be noted that the formulation of command signals as herein discussed is closely aligned and may be identical with the formulation of command signals in autopilot computing circuits. Thus the bank command signals defined herein might be the command signals as applied to the aileron control servo loop of an autopilot, while a pitch command signal as defined herein might be that applied to the elevator servo control channel of an autopilot. In the autopilot are, the command signal is responded to by the appropriate control surface servo loop which is closed by control surface position feed-back. In the instrumentation usage as described herein, the command is displayed visually to the pilot and the pilot acts as a positioning servo loop to respond to the command while the position feed-back is that of a visual interpretation of the proper alignment of the command plane indicator with the aircraft simulating reference. For the purpose of the present invention, the pitch and bank command signals are signals indicative of those aircraft pitch and bank attitudes which are necessary to make good a given flight path and not necessarily those which exist at any given instant as indicated by the pitch and bank attitude defining signals from the vertical gyro. The command signals are zero when the pilot has introduced steering changes which if maintained will bring the aircraft on to the desired course and with the proper attitude. By the same token, the command signals in aircraft autopilots are zero when the control surfaces have been positioned in proper response to the input signals.

Translation of runaway simulator member 90 in accordance with aircraft deviation from a radio defined course is realized by a rotation of the assembly mounting shaft 77 by deviation servomotor 74. This rotation is in response to the course deviation signal applied to the motor through connector 400 from computer 600. The basic sensor for this signal is that of navigation receiver 602 which might be a VOR receiver developing a direct-current output signal with polarity and magnitude indicative of the aircraft deviation from a preselected VOR course. Alternatively, the radio signal from receiver 602 might be indicative of deviation from a localizer course to which the receiver would be responsive in an approach and touchdown operational mode. In either mode, the computer 600 would include means to convert the direct-current deviation signal to a corresponding multiphase alternating-current signal for synchro usage.

FIGURES 2 through 5 illustrate observer's views of the front face of the assembled instrument under various situations of attitude and command situations. FIGURE 2 illustrated the pictorial display of a straight and level aircraft attitude combined with a straight and level aircraft command signal. In accordance with a preselected course, the runway or course simulator 90 is seen to be centered with respect to the vertical reference line 24 on the horizon tape 34 to indicate an "on-course" condition. Straight and level attitude is depicted by the alignment of the horizon indicator 19 with the horizontal reference lines 19a and 19b and the juxtaposition of the rearward extremity (nose) of aircraft simulator 13 with the horizon indicator 19. A straight and level command is indicated by the command markers 65–66 being symmetrically juxtaposed with the transverse dimensions of the aircraft simulator 13; the plane defined by the simulator 13 and the command indicator being coincident. The command indexes 66 are seen to be juxtaposed and aligned with the "wing tip" extremes of aircraft simulator 13.

A change in the flight situation, as might be initiated by a selection of a new radio course or by a commanded change in pitch or altitude, would cause the displacement and/or rotation of the command indicator plane defined by members 65–66 from that illustrated in FIGURE 2. The pilot would then initiate corrective pitch and bank control actions such that the aircraft simulator 13 would once again be juxtaposed with and confined by the command indicator members.

Figure 3:
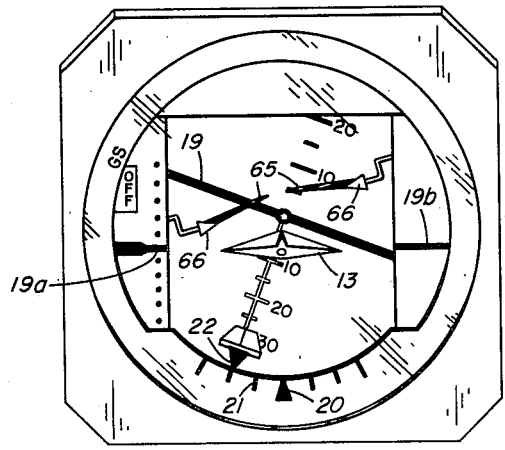
FIGURE 3 is an observer's view of the instrument under a condition of diving left bank attitude and climbing increased left bank command.

FIGURE 3 depicts the aircraft in an attitude defining a descending left bank. A pitch attitude of approximately −2½° is depicted by the position of the rearward extremity of aircraft simulator 13 with respect to the calibrations 26 on the lower portion of the horizon tape 34. The bank attitude is indicated as being approximately 20° to the left as indicated by the position of bank indicating pointer 22 with respect to the reference marks 21. The command pictorially displayed in the situation depicted in FIGURE 3 is that of "pitch-up and increased left bank" as defined by the respective upward translation of the command indicator plane and counter-clockwise rotation thereof with respect to the aircraft simulator 13. It is noted that the command of "pitch-up and increased left bank" from the instantaneous aircraft attitude is realistically displayed as an upwardly inclined and banked flight-path "onto which" the aircraft reference 13 is to be "flown." In response to control reactions initiated by the pilot to attain the commanded flight path, the positioning of the aircraft on the command plane is simulated by the command plane being again symmetrically juxtaposed about the aircraft reference 13. It is to be realized that although an increased left bank is commanded, the horizon indicator 19 continues to function in accordance with the current attitude of the aircraft with respect to the ground and that the horizon indicator and the command indicator coact to present the flight situation in a truly pictorial manner.

Figure 4:
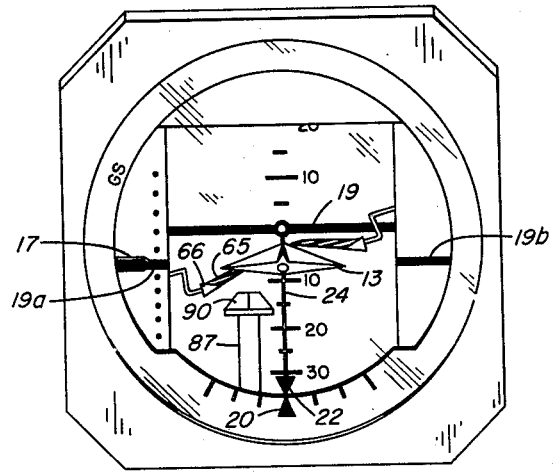
FIGURE 4 is an observer's view of the instrument under an aproach situation showing displacement of runway and left bank command for correction.

FIGURE 4 illustrates an observer's view of the instrument indicative of an approach mode of operation wherein the runway simulator 90 shows the relative alignment between aircraft and runway together with the altitude of the aircraft above the runway. The indicated aircraft attitude shown in FIGURE 4 is that of zero bank and a slight negative pitch as might be associated with a glide slope approach. The displacement of runway simulator 90 to the left of zero reference depicts that the aircraft is to the right of runway. The command depicted in FIGURE 4 is that of a slight left bank as depicted by the rotation of the command plane defined by members 65–66 with respect to that defined by the aircraft simulator 13. The pitch command is zero since the rearward extremity of aircraft simulator 13 remains juxtaposed with the rearward extremes of the command indicator members 65–66. In response to a left bank corrective maneuver, the aircraft displacement from the runway would decrease accordingly and the runway simulator 90 would center beneath the aircraft simulator 13 as bank command reduced to zero with the command markers 65–66 again symmetrically juxtaposed about the transverse extremes of the aircraft simulator 13. The distance between runway simulator 90 and aircraft simulator 13 would be indicative of the altitude of the aircraft above the runway and, as the approach became finalized, the runway simulator 90 would raise into juxtaposition with the lower extremes of the aircraft simulator 13. The glide slope pointer 17 is shown "centered" by its alignment with horizontal reference 19a to indicate that the aircraft is on the glide path although it is displaced to the right of the localizer path.

Figure 5:
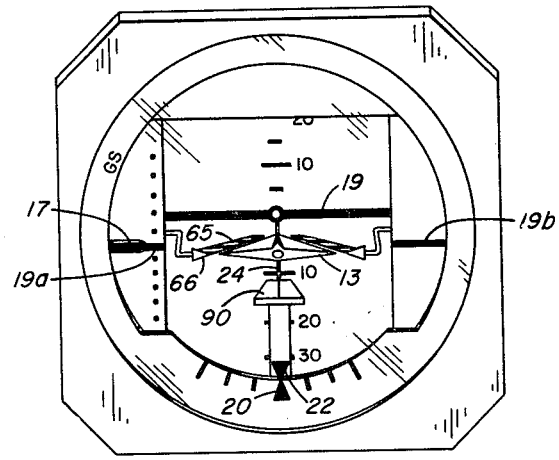
FIGURE 5 is an observer's view of an instrument showing a corrected approach flight situation.

FIGURE 5 represents an observer's view which might be that resulting from corrective action in response to the command indicated in FIGURE 4. The aircraft attitude is that of the desired nose-down level approach; the command is "zero"; and the runway simulator 90 is centered beneath the aircraft reference 13.

The present invention is thus seen to provide a truly pictorial display of aircraft attitude and command data in a realistic manner which is directly interpretable by the pilot. The command is presented as a "path" upon which the symbolic aircraft reference is to be "flown." The pilot need only then initiate natural responses somewhat the same as an automobile driver follows a highway. The relative movement between the aircraft simulator 13 and that of the command plane is three-dimensional in nature and therefore realistically provides a pictorial display of the flight situation. The attainment of a command is advantageously displayed by the symbolic aircraft being flown onto the command path. This improved pictorial display is attained by the relative movement of the command plane in a three-dimensional sense with respect to the aircraft reference simulator 13 whose axes define a plane simulating with that defined by the longitudinal and lateral axes of the aircraft. The further inclusion of a pictorial display of course deviation or runway position and altitude is advantageously combined with the command and attitude indications in a manner completely compatible with the pilot's orientation and reactive sensing so that the command display is more truly that of a forward "window like" picture of the attitude, displacement and corrective command situation by which a desired flight pattern may be attained and held.

Although this invention has been described with respect to a particular embodiment thereof, it is not to be so limited as changes might be made therein within the scope of the invention as defined by the appended claims.

We claim:

1. An aircraft attitude and command indicator instrument comprising a first horizon simulating indicator, an aircraft simulating reference rigidly affixed to and symmetrically disposed with respect to the longitudinal axis of said instrument, means for moving said first indicator with respect to said reference in accordance with pitch and bank attitudes of said aircraft, a second indicator member, said second indicator member being symmetrically and confiningly disposable about the transverse dimensions of said fixed reference, means for rotating said second indicator member about the longitudinal axis of said instrument in accordance with bank command signals, and means for displacing said second indicator member transversely of said instrument longitudinal axis in accordance with pitch command signals.

2. An aircraft attitude and command indicator instrument comprising a first horizon simulating indicator, an aircraft simulating reference rigidly affixed to and symmetrically disposed with respect to the longitudinal axis of said instrument, means for moving said first indicator with respect to said reference in accordance with pitch and bank attitudes of said aircraft, a second indicator having first and second mutually-fixed space-separated coplanar portions thereof disposable respectively about opposing extremes of the transverse dimensions of said fixed reference, means for rotating said second indicator portions about the longitudinal axis of said instrument in accordance with bank command signals, and means for displacing said indicator portions transversely of said instrument longitudinal axis in accordance with pitch command signals.

3. An aircraft flight director instrument comprising a first horizon simulating indicator, an aircraft simulating reference rigidly affixed to the front face of said instrument and symmetrically disposed with respect to the longitudinal axis of said instrument so as to define aircraft longitudinal and transverse axes, means for stabilizing said first indicator against changes in aircraft bank attitude from horizontal, means for transversely displacing said first indicator from said instrument longitudinal axis in accordance with aircraft pitch attitude, a second indicator, said second indicator being juxtapositionable with the transverse dimensions of said fixed aircraft reference, means for rotating said second indicator about the longitudinal axis of said instrument in accordance with bank command signals, and means for displacing said second indicator transversely of said instrument longitudinal axis in response to pitch command signals.

4. An aircraft flight director instrument comprising a first horizon simulating indicator, an aircraft simulating reference rigidly affixed to the front face of said instrument and symmetrically disposed with respect to the longitudinal axis of said instrument so as to define aircraft longitudinal and lateral axes, means for stabilizing said first indicator against changes in aircraft bank attitude from horizontal, means for transversely displacing said first indicator from said instrument longitudinal axis in accordance with aircraft pitch attitude, a second indicator having first and second index members respectively juxtapositionable with the transverse dimensions of said fixed aircraft reference, means for rotating said second indicator about the longitudinal axis of said instrument in accordance with bank command signals, and means for displacing said second indicator transversely of said instrument longitudinal axis in response to pitch command signals.

5. An aircraft attitude and command indicator instrument comprising a first horizon simulating indicator, an aircraft simulating reference rigidly affixed to the instrument and symmetrically disposed transverse to the longitudinal axis of said instrument, said simulating reference additionally extending along the longitudinal axis of said instrument, means for moving said first indicator with respect to said reference in accordance with pitch and bank attitudes of said aircraft, a second indicator lying in and defining a command plane and being symmetrically and conformingly disposable about the transverse dimensions of said fixed reference, and means for displacing and rotating said second indicator with respect to said reference in accordance with pitch and bank command signals, respectively.

6. An aircraft attitude and command indicator instrument comprising a first indicator extending transverse of and rotatably positionable about the longitudinal axis of said instrument, said first indicator being transversely displaceable with respect to said instrument longitudinal axis, a fixed reference member symbolic of said aircraft and defining aircraft longitudinal and lateral axes, the longitudinal axis defined by said reference member being coincident with said instrument longitudinal axis, a second indicator rotatable about said instrument longitudinal axis and transversely displaceable with respect to said instrument longitudinal axis, said first indicator being juxtapositionable with said fixed reference member, said second indicator being symmetrically and confiningly juxtapositionable with respect to the transverse dimensions of said fixed reference member, positioning means responsive to aircraft bank attitude connected to and effecting rotation of said first indicator about said instrument longitudinal axis, positioning means responsive to aircraft pitch attitude connected to and effecting transverse displacement of said first indicator with respect to said instrument longitudinal axis, positioning means responsive to pitch command signals connected to and effecting transverse displacement of said second indicator with respect to said instrument longitudinal axis, and positioning means responsive to bank command signals connected to and effecting rotation of said second indicator with respect to said instrument longitudinal axis.

7. An aircraft attitude and command indicator instrument comprising a first indicator extending transverse of and rotatably positionable about the longitudinal axis of said instrument, said first indicator being additionally transversely displaceable with respect to said instrument longitudinal axis, a fixed reference member symbolic of said aircraft and defining aircraft longitudinal and lateral axes, the longitudinal axis defined by said reference member being coincident with said instrument longitudinal axis, a second indicator rotatable about said instrument longitudinal axis and transversely displaceable with respect to said instrument longitudinal axis, said first indicator being juxtapositionable with said fixed reference member, said second indicator including first and second index portions definingly juxtapositionable with respect to the transverse dimensions of said fixed reference member, positioning means responsive to aircraft bank attitude connected to and effecting rotation of said first indicator about said instrument longitudinal axis, positioning means responsive to aircraft pitch attitude connected to and effecting transverse displacement of said first indicator with respect to said instrument longitudinal axis, positioning means responsive to pitch command signals connected to and effecting transverse displacement of said second indicator with respect to said instrument longitudinal axis, and positioning means responsive to bank command signals connected to and effecting rotation of said second indicator with respect to said instrument longitudinal axis.

8. An aircraft attitude and command indicator instrument comprising a first horizon simulating indicator, an aircraft simulating reference rigidly affixed to and symmetrically disposed with respect to the longitudinal axis of said instrument, means for moving said first indicator with respect to said reference in accordance with pitch and bank attitudes of said aircraft, a second indicator having first and second portions thereof disposable respectively about the transverse dimensions of said fixed reference, means for moving said second indicator with respect to said reference in accordance with pitch and bank command signals, a third indicator disposed in a plane beneath and substantially parallel to said first indicator and parallel to the longitudinal axis of said instrument, and means for displacing said third indicator substantially within said aforedefined plane in accordance with signals definitive of aircraft displacement from a selected course.

9. An aircraft attitude and command indicator instrument comprising a first horizon simulating indicator, an aircraft simulating reference rigidly affixed and symmetrically disposed transverse to the longitudinal axis of said instrument, said simulating reference additionally extending along the longitudinal axis of said instrument, means for moving said first indicator with respect to said reference in accordance with pitch and bank attitudes of said aircraft, a second indicator lying in and defining a command plane and being symmetrically and conformingly disposable about the transverse dimensions of said reference, means for displacing and rotating said second indicator with respect to said reference in accordance with pitch and bank command signals respectively, a third indicator disposed in a plane beneath and substantially parallel to said first indicator and parallel to the longitudinal axis of said instrument, and means for displacing said third indicator substantially within said aforedefined plane in accordance with signals definitive of aircraft displacement from a selected course.

10. An aircraft flight director instrument comprising a first horizon simulating indicator, an aircraft simulating reference rigidly affixed to said instrument and symmetrically disposed with respect to the longitudinal axis of said instrument so as to define longitudinal and transverse axes respectively parallel to those of said aircraft, means for stabilizing said first indicator against changes in aircraft bank attitude from horizontal, means for transversely displacing said first indicator in accordance with aircraft pitch attitude, a second indicator having first and second index members respectively juxtapositionable with the transverse dimensions of said fixed aircraft reference, means for rotating said second indicator about said instrument longitudinal axis in accordance with bank command signals, means for displacing said second indicator transversely of said instrument longitudinal axis in response to pitch command signals, a third bank stabilized indicator disposed in a plane beneath and substantially parallel to said first indicator and parallel to said instrument longitudinal axis, means for displacing said third indicator transversely of said aforedefined plane in accordance with aircraft altitude above a predetermined reference, and means for displacing said third indicator substantially within said aforedefined plane and transversely of said instrument longitudinal axis in accordance with aircraft deviation from a preselected course.

11. An aircraft flight director instrument assembly comprising an aircraft simulating reference affixed to a forwardly disposed transparent face member of said instrument and extending transversely of the longitudinal axis of said instrument and additionally extending along the longitudinal axis of said instrument, said simulating reference having lateral and longitudinal axes respectively parallel to the lateral and longitudinal axes of said aircraft; a horizon simulating assembly mounted for rotation about the longitudinal axis of said instrument assembly, means for stabilizing said horizon simulating assembly against changes in aircraft banking attitude from horizontal, said horizon indicating assembly comprising a viewable portion thereof juxtapositioned with the rearward longitudinal extreme of said aircraft simulating reference and having affixed thereon a reference indicator, means for displacing said reference indicator transversely of the longitudinal axis of said instrument assembly in accordance with pitch attitude of said aircraft; a command indicator, said command indicator comprising first and second transversely disposed longitudinally extended index members lying in and defining a command plane, said index members being confiningly juxtapositionable with said transverse extensions of said aircraft simulating reference; means for rotating said command indicator with respect to the longitudinal axis of said instrument assembly in accordance with bank command signals; and means for transversely displacing said command indicator with respect to said assembly longitudinal axis in accordance with pitch command signals.

12. An aircraft flight director instrument assembly comprising an aircraft simulating reference affixed to a front face member of said instrument and extending transversely of the longitudinal axes of said instrument, said simulating reference additionally extending along the longitudinal axis of said instrument, said simulating reference having lateral and longitudinal axes respectively parallel to the lateral and longitudinal axes of said aircraft; a horizon simulating assembly mounted for rotation about the longitudinal axis of said instrument assembly, means for stabilizing said horizon simulating assembly against changes in aircraft bank attitude from horizontal, said horizon indicating assembly comprising a viewable face portion juxtapositionable with the rearward longitudinal extreme of said aircraft simulating reference and having affixed thereon a reference indicator, means for displacing said reference indicator transversely of the longitudinal axis of said instrument assembly in accordance with pitch attitude of said aircraft; a command indicator, said command indicator comprising first and second transversely disposed longitudinally extended index members confiningly juxtapositionable with said transverse extensions of said aircraft simulating reference; means for rotating said command indicator with respect to the longitudinal axis of said instrument assembly in accordance with bank command signals; means for transversely displacing said command indicator with respect to the longitudinal axis of said assembly in accordance with pitch command signals, a further indicator defining a plane disposed substantially parallel to the longitudinal axis of said assembly and to said horizontal assembly reference indicator; means for stabilizing said further indicator against changes in aircraft bank attitude from horizontal, and means for translatively displacing said further indicator within the plane defined thereby and transversely of the longitudinal axis of said instrument in accordance with aircraft deviation from a preselected course.

13. An aircraft flight director instrument assembly comprising an aircraft simulating reference affixed to a front face member and symmetrically disposed with respect to the longitudinal axis of said instrument, said aircraft simulating reference defining a plane indicative of the longitudinal and lateral axes of said aircraft; said aircraft simulating reference being generally triangularly-shaped and tapered inwardly from the front face member; a horizon simulating indicator carried behind said face member and juxtaposed with the rearward extremity of said airplane simulating reference, means for rotating said horizon indicator with respect to said instrument longitudinal axis in accordance with aircraft bank attitude, means for displacing said horizon indicator transversely of said instrument longitudinal axis in accordance with aircraft pitch attitude, a command plane marker, said command plane marker being generally V-shaped and confiningly juxtapositionable with the transverse dimensions of said aircraft simulating reference; means for rotating said command plane marker about said instrument longitudinal axis in accordance with bank command signals and means for displacing said command plane marker transversely with respect to said instrument longitudinal axis in accordance with aircraft pitch command signals.

14. An aircraft flight director instrument assembly comprising an aircraft simulating reference affixed to a front face member and symmetrically disposed with respect to the longitudinal axis of said instrument, said aircraft simulating reference defining a plane indicative of the longitudinal and lateral axes of said aircraft; said aircraft simulating reference being generally triangularly-shaped and tapered inwardly from the front face member; a horizon simulating indicator carried in a plane substantially parallel to that of said face member and juxtaposed with the rearward extremity of said airplane simulating reference, means for rotating said horizon indicator with respect to said instrument longitudinal axis in accordance with aircraft bank attitude, means for displacing said horizon indicator transversely of said instrument longitudinal axis in accordance with aircraft pitch attitude, a command plane marker, said command plane marker being generally V-shaped and confiningly juxtapositionable with the transverse dimensions of said aircraft simulating reference; means for rotating said command plane marker about said instrument longitudinal axis in accordance with bank command signals and means for displacing said command plane marker transversely with respect to said instrument longitudinal axis in accordance with aircraft pitch command signals, said last named means including means for simultaneously effecting an inclination of said command plane marker from the longitudinal axis of the instrument in the simulated direction of flight, said inclination being in proportion to the extent of transverse displacement of said command plane marker.

15. An aircraft flight director instrument assembly comprising a fixed front face member, a fixed rearwardly disposed mounting plate member; a horizon simulating assembly mounted for rotation about a longitudinal axis perpendicular to said face member and said mounting plate member, means for stabilizing said horizon simulating assembly against changes in aircraft bank attitude from horizontal; said horizon simulating assembly comprising a supporting frame, a tape member carried by said supporting frame and having a viewable portion thereof disposed in a plane parallel to that of said face member and disposed rearwardly thereof; a horizon simulating reference extending transversely on said tape, means for translating said viewable portion of said tape transversely with respect to said longitudinal axis; an aircraft simulating member affixed to said front face member and extending transversely thereof; said aircraft simulating member additionally extending longitudinally inward with decreasing transverse dimension into juxtaposition with said viewable portion of said horizon tape member; a command indicator assembly comprising a command marker defining a command plane, a recessed portion of said command marker being of conforming dimensions with respect to said aircraft simulating member and confiningly juxtapositionable with respect to the transverse dimensions of said simulating member; means for rotating said command plane member about said longitudinal axis in accordance with bank command signals; and means for displacing said command plane transversely to said longitudinal axis in accordance with pitch command signals.

16. An aircraft flight director instrument assembly comprising an aircraft simulating reference affixed to a front face member and symmetrically disposed with respect to the longitudinal axis of said instrument, said aircraft simulating reference defining a plane indicative of the longitudinal and lateral axes of said aircraft; said aircraft simulating reference being generally triangularly-shaped and tapered inwardly from the front face member; a horizon simulating indicator carried in a plane substantially parallel to that of said face member and juxtaposed with the rearward extremity of said airplane simulating reference, means for rotating said horizon indicator with respect to said instrument longitudinal axis in accordance with aircraft bank attitude, means for displacing said horizon indicator transversely of said instrument longitudinal axis in accordance with aircraft pitch attitude, a command plane marker, said command plane marker being generally V-shaped and confiningly juxtapositionable with the transverse dimensions of said aircraft simulating reference; means for rotating said command plane marker about said instrument longitudinal axis in accordance with bank command signals and means for displacing said command plane marker transversely with respect to said instrument longitudinal axis in accordance with aircraft pitch command signals, a further indicator defining a plane parallel to and displaced beneath said instrument longitudinal axis and said horizon indicator, said further indicator being tapered inwardly from said front face member, and means for translatively displacing said further indicator within the plane defined thereby and transversely of the longitudinal axis of said instrument in accordance with aircraft deviation from a preselected course.

17. An aircraft instrument comprising a fixed aircraft simulating reference, a horizon simulating reference indicator rotatably positioned in accordance with aircraft bank attitude and transversely displaceable in accordance with aircraft pitch attitude, a command plane indicator, said command plane indicator being confiningly juxtapositionable about the transverse dimensions of said aircraft simulating reference, means for rotating said command plane indicator about an axis coincident with the longitudinal axis of said aircraft simulating reference in accordance with bank command signals, means for displacing said command plane indicator transversely of the rotational axis thereof in accordance with pitch command signals, said last-named displacing means including means to simultaneously effect an inclination of the plane defined by said command indicator from the longitudinal axis in direct proportion to the transverse displacement therefrom.

18. An aircraft instrument including a fixed aircraft simulating reference and a horizon simulating reference indicator rotatably positioned in accordance with aircraft bank attitude and transversely displaceable in accordance with aircraft pitch attitude, a command plane indicator, said index members being defining a command plane, said command plane indicator being confiningly juxtapositionable about the transverse dimensions of said aircraft simulating reference, means for rotating said command plane indicator about an axis coincident with the longitudinal axis of said aircraft simulating reference in accordance with bank command signals, means for displacing said command plane indicator transversely of the rotational axis thereof in accordance with pitch command signals, said last-named displacing means including means to simultaneously effect an inclination of the plane defined by said command plane indicator from the instrument longitudinal axis in the direction of simulated flight, said inclination being in direct proportion to the transverse displacement of said command plane indicator from said instrument longitudinal axis.

19. An aircraft flight director instrument assembly comprising a fixed front face member, a fixed rearwardly disposed mounting plate member; a horizon simulating assembly mounted for rotation about a longitudinal axis perpendicular to said face member and said mounting plate member, means for stabilizing said horizon simulating assembly against changes in aircraft bank attitude from horizontal; said horizon simulating assembly comprising a supporting frame, a spherical member rotatably mounted with respect to said supporting frame about an axis transverse that of said longitudinal axis and having a viewable portion thereof disposed rearwardly of said face member, a horizon simulating reference extending transversely on said spherical member, means for rotating said spherical member with respect to said supporting frame; an aircraft simulating member affixed to said front face member and extending transversely thereof; said aircraft simulating member additionally extending longitudinally inward with decreasing transverse dimension into juxtaposition with said viewable portion of said spherical member; a command indicator assembly comprising a command marker defining a command plane, a recessed portion of said command marker being of like dimensions with respect to said aircraft simulating member and confiningly juxtapositionable with respect to the transverse dimensions of said simulating member; means for rotating said command plane member about said longitudinal axis in accordance with bank command signals; and means for displacing said command plane member transverse of said longitudinal axis in accordance with pitch command signals.

References Cited by the Examiner

UNITED STATES PATENTS

| | | |
|---|---|---|
| 2,613,352 | 10/52 | Kellogg. |
| 2,823,378 | 2/58 | Reedy et al. _____ 73—178 X |
| 2,932,024 | 4/60 | Sant Angelo _____ 73—178 X |
| 2,943,482 | 7/60 | Fritze et al. _____ 73—178 |
| 3,094,971 | 6/63 | Guarino et al. _____ 73—178 X |

ROBERT B. HULL, *Primary Examiner.*

LOUIS R. PRINCE, *Examiner.*

UNITED STATES PATENT OFFICE
CERTIFICATE OF CORRECTION

Patent No. 3,162,834                          December 22, 1964

Horst M. Schweighofer et al.

It is hereby certified that error appears in the above numbered patent requiring correction and that the said Letters Patent should read as corrected below.

Column 1, line 67, for "coats" read -- coacts --; column 11, line 6, for "are" read -- art --; column 16, line 1, for "forwordly" read -- forwardly --; column 16, line 50, before "confiningly" insert -- defining a command plane, said index members being --; column 18, line 58, strike out "defining a command plane, said index members being".

Signed and sealed this 4th day of May 1965.

(SEAL)
Attest:

ERNEST W. SWIDER                               EDWARD J. BRENNER
Attesting Officer                                    Commissioner of Patents